(12) United States Patent
Hsieh

(10) Patent No.: US 8,944,224 B2
(45) Date of Patent: Feb. 3, 2015

(54) MAINTENANCE AUXILIARY TOOL OF BRAKE SYSTEM

(71) Applicant: Bao-Ching Hsieh, Bade (TW)

(72) Inventor: Bao-Ching Hsieh, Bade (TW)

( * ) Notice: Subject to any disclaimer, the term of this patent is extended or adjusted under 35 U.S.C. 154(b) by 180 days.

(21) Appl. No.: 13/759,110

(22) Filed: Feb. 5, 2013

(65) Prior Publication Data

US 2013/0298543 A1 Nov. 14, 2013

(30) Foreign Application Priority Data

May 8, 2012 (TW) .............................. 101208579 A
Dec. 12, 2012 (TW) .............................. 101224092 A

(51) Int. Cl.
*B60T 11/00* (2006.01)
*F16B 21/00* (2006.01)
*B60T 17/22* (2006.01)

(52) U.S. Cl.
CPC ............... *F16B 21/00* (2013.01); *B60T 17/222* (2013.01)
USPC .............................................. 188/352; 303/7

(58) Field of Classification Search
CPC ............................... B60T 17/222; F15B 21/00
USPC .............................................. 188/352; 303/7
See application file for complete search history.

(56) References Cited

U.S. PATENT DOCUMENTS

| | | | | |
|---|---|---|---|---|
| 2,964,965 | A * | 12/1960 | Hanson | 74/481 |
| 3,226,997 | A * | 1/1966 | Malloy | 74/482 |
| 3,318,422 | A * | 5/1967 | Frescura | 188/112 R |
| 3,749,212 | A * | 7/1973 | Black | 477/192 |
| 3,866,719 | A * | 2/1975 | Streutker | 188/3 R |
| 3,877,318 | A * | 4/1975 | Castoe | 74/481 |
| 4,186,595 | A * | 2/1980 | Domitter | 73/132 |
| 5,012,689 | A * | 5/1991 | Smith | 74/89.17 |
| 5,031,729 | A * | 7/1991 | Wittkop et al. | 188/3 H |
| 5,299,668 | A * | 4/1994 | Youngers et al. | 188/352 |
| 5,411,321 | A * | 5/1995 | Harness | 303/7 |
| 5,417,127 | A * | 5/1995 | Bueti et al. | 74/532 |
| 5,465,813 | A * | 11/1995 | Lichter | 188/3 H |
| 5,915,797 | A * | 6/1999 | Springer | 303/7 |
| 6,095,619 | A * | 8/2000 | Granata | 303/7 |
| 6,126,246 | A * | 10/2000 | Decker et al. | 303/7 |
| 6,131,712 | A * | 10/2000 | Rhodenizer | 188/352 |
| 6,279,418 | B1 * | 8/2001 | Olive, Jr. | 74/532 |
| 6,959,793 | B2 * | 11/2005 | Cinquemani | 188/112 R |
| D606,431 | S * | 12/2009 | Mason | D10/78 |
| 8,651,585 | B2 * | 2/2014 | Kaminski et al. | 303/7 |
| 8,720,861 | B2 * | 5/2014 | Lee | 254/93 VA |
| 2001/0047915 | A1 * | 12/2001 | Takakubo et al. | 188/352 |
| 2012/0187358 | A1 * | 7/2012 | Lee | 254/93 VA |
| 2013/0002050 | A1 * | 1/2013 | Knestel et al. | 310/12.04 |
| 2013/0284015 | A1 * | 10/2013 | Menten | 92/145 |

* cited by examiner

*Primary Examiner* — Robert A Siconolfi
*Assistant Examiner* — Charles Poon
(74) *Attorney, Agent, or Firm* — Myers Bigel Sibley & Sajovec, P.A.

(57) ABSTRACT

A maintenance auxiliary tool of brake system includes a main body, a locking module, a pneumatic module and a controller. The main body includes an outer rod, a support rod and an adjusting rod. The pneumatic module includes a pneumatic cylinder, a first airflow device, a second airflow device and an action rod. When the switch is operated to push a high pressure air into the pneumatic cylinder through the second airflow device, the action rod is pushed to drive the brake pedal toward. When the switch is operated to push a high pressure air into the pneumatic cylinder through the first airflow device, the action rod is pushed to drive the brake pedal backward. The replacement of the brake oil will be completed by repeating the above operation which drives the brake pedal to go backward and toward in a manner to expel air within an oil pipe.

10 Claims, 7 Drawing Sheets

MAINTENANCE AUXILIARY TOOL OF BRAKE SYSTEM

FIELD OF THE INVENTION

The present invention relates to a maintenance auxiliary tool and more particularly to a maintenance auxiliary tool of brake system which pushes a high pressure air into pneumatic cylinder by controlling a switch so as to push an action rod going toward and backward to make a contact member to drive the brake pedal moving toward and downward in a manner to expel air from an oil pipe when replacing brake oil.

BACKGROUND OF THE INVENTION

With the development of modern technology, the performance of cars is improved to fully meet the demands of people for pursuing driving pleasure. A good car should not only be excellent in its high-powered and fast, but should also be ensured with its outstanding operation of the brake system at any time as an indispensable element.

In the process of maintenance of a car brake system, the most important thing is the replacement of the brake oil. The prior art of brake oil replacement is achieved by having one person in front of the car who is in charge of commanding and filling the new brake oil in an oil tank, and having another person inside the car who continues to depress the brake pedal by foot to completely expel the old brake oil and air in the brake system. However, the above prior art process must be complemented by two people, so it is cost-waste. Therefore, the improvement is required.

In view of this, the inventor bases on his experience in the field of manufacture and products development to solve the above problem.

SUMMARY OF THE INVENTION

The present invention is to overcome the above mentioned problems of prior art brake oil replacement that needs one person in front of the car who is in charge of commanding and filling the new brake oil in an oil tank, and requires another person inside the car who continues to depress the brake pedal by foot to completely expel the old brake oil and air in the brake system. The above prior art process must be complemented by two people, so it is cost-waste.

The present invention overcomes the drawbacks of the prior art, and provides a maintenance auxiliary tool of brake system. The maintenance auxiliary tool of brake system comprises: a main body including an outer rod, a support rod and an adjusting rod, the outer rod provided with a first axial hole on its center axis and provided with a support frame at one end of the outer rod, a first adjusting member provided at one end of the support frame and longitudinally adjustable, a second adjusting member provided at the other end of the support frame and longitudinally adjustable, the first adjusting member and the second adjusting member arranged on the support frame and a transversely distance therebetween is adjustable, the outer rod longitudinally provided with a first cut slot and a second cut slot on its external circumference along its axial direction, one side of an external circumference of the support rod connected with the external circumference of the outer rod, the support rod longitudinally provided with a second axial hole on its center axis, the adjusting rod provided with a connection element at one end thereof and provided a ratchet element in a middle of an external circumference of the adjusting rod, the connection element provided with a top supporting member, the top supporting member provided with a concave slot;

a locking module provided in the other side of the external circumference of the support rod, the locking module connected to the ratchet part;

a pneumatic module including a pneumatic cylinder, a first airflow device, a second airflow device and an action rod, the pneumatic cylinder and an elastic element received within the first axial hole in sequence, the first airflow device placed within the first cut slot and connected with one end of an external circumference of the pneumatic cylinder, the second airflow device placed within the second cut slot and connected with the other end of the external circumference of the pneumatic cylinder, the first airflow device and the second airflow device depressing the first cut slot and the second cut slot respectively, the action rod connected to one end of the pneumatic cylinder, one end of the action rod connected to a piston and the other end of the action rod connected to a contact member, the first airflow device provided with a first adjusting valve on its top surface and provided with a first airflow opening on its external circumference, the second airflow device provided with a second adjusting valve on its top surface and provided with a second airflow opening on its external circumference; and a controller communicated with the first airflow opening and the second airflow opening.

In a preferred embodiment of the present invention, the first adjusting member and the second adjusting member both are provided with an elastic skid-proof member on their bottoms, and the elastic skid-proof member is flexible in longitudinal direction.

In a preferred embodiment of the present invention, the support frame is provided with a first screw hole on one side of the support frame and provided with a second screw hole on the other side of the support frame, the first adjusting member is provided with a first longitudinal slot, a first screw is threaded in the first screw hole through a first washer and the first longitudinal slot in sequence, the second adjusting member is provided with a second longitudinal slot, a second screw is threaded in the second screw hole through a second washer and the second longitudinal slot in sequence.

In a preferred embodiment of the present invention, one end opposite to the support frame of the first axial hole is connected to a cover, the first axial hole is provided with a top holding member between the cover and the elastic element, the cover is longitudinally provided with a screw hole on its center, the screw hole is threaded with an adjusting screw, the adjusting screw is provided with a knob at one end of the adjusting screw and provided with a nut on its external circumference.

In a preferred embodiment of the present invention, the support rod is provided with a first connecting part and a second connecting part on one side of the external circumference of the support rod, the first connecting part and the second connecting part are connected the external circumference of the outer rod.

In a preferred embodiment of the present invention, the first cut slot and the second cut slot are provided with a linear arrangement along the axial direction.

In a preferred embodiment of the present invention, the locking module includes a bearer, a holder, a locking rod, a locking base and a pressing member, the bearer and the holder are provided on the other side of the external circumference of the support rod, the locking base is connected to the bearer through a washer, the locking rod is provided with a locking part at one end of the locking rod and provided with a ring groove at the other end of the locking rod, the locking part is closely provided with a blocking part, the locking rod is sleeved and covered by a spring and the locking base, a middle of the depressing member is pivoted to the holder, the depressing member is provided with an engaging section at one end of the depressing member and provided with a pressing section at the other end of the depressing member, the engaging section is engaged to the ring groove.

In a preferred embodiment of the present invention, the controller is mounted in a worktable and provided with a third airflow opening and a fourth airflow opening on one side of the controller, the first airflow opening and the third airflow opening are communicated through a first air pipe, the second airflow opening and the fourth airflow opening are communicated through a second air pipe, the controller is provided with an air-in opening on the other side of the controller, the air-in opening is provided with a first air-out opening and a second air-out opening on two sides of the air-in opening, the air-in opening is communicated to an air-supplying device through a third air pipe, the controller is provided with a switch on its top. p In a preferred embodiment of the present invention, the elastic element is a compression spring for withstanding the pneumatic cylinder therewith, In a preferred embodiment of the present invention, the ratchet part is provided with a blocking ring on its bottom.

By the above means, the first adjusting member and second adjusting member is respectively provided on two sides of a brake pedal inside the car and the top supporting member is withstood the steering wheel, so that the installation is completed. It found that the process of brake oil replacement is achieved by only having one person who is filling the new brake oil and at the same time is controlling the switch to push high pressure air into the pneumatic cylinder, so as to push an action rod going toward and backward for making a contact member to drive the brake pedal backward and toward in a manner to expel air from an oil pipe. Therefore, the working hours and the operating costs are reduced.

BRIEF DESCRIPTION OF THE DRAWINGS

The structure and the technical means adopted by the present invention for achieving the above and other objects can be best understood by referring to the following detailed description of the preferred embodiments and the accompanying drawings.

DETAILED DESCRIPTION OF THE PREFERRED EMBODIMENTS

Figure 1:
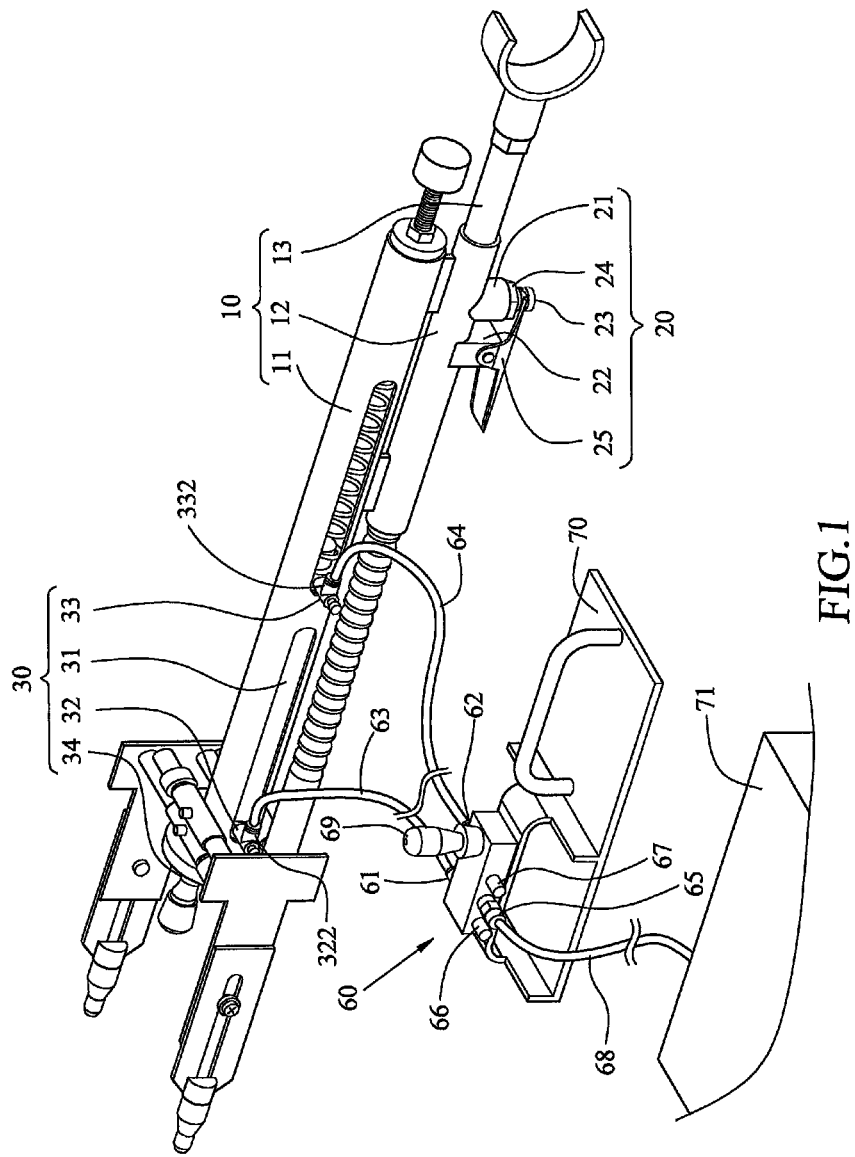
FIG. 1 is a stereogram illustrating an embodiment according to the present invention.
Figure 2:
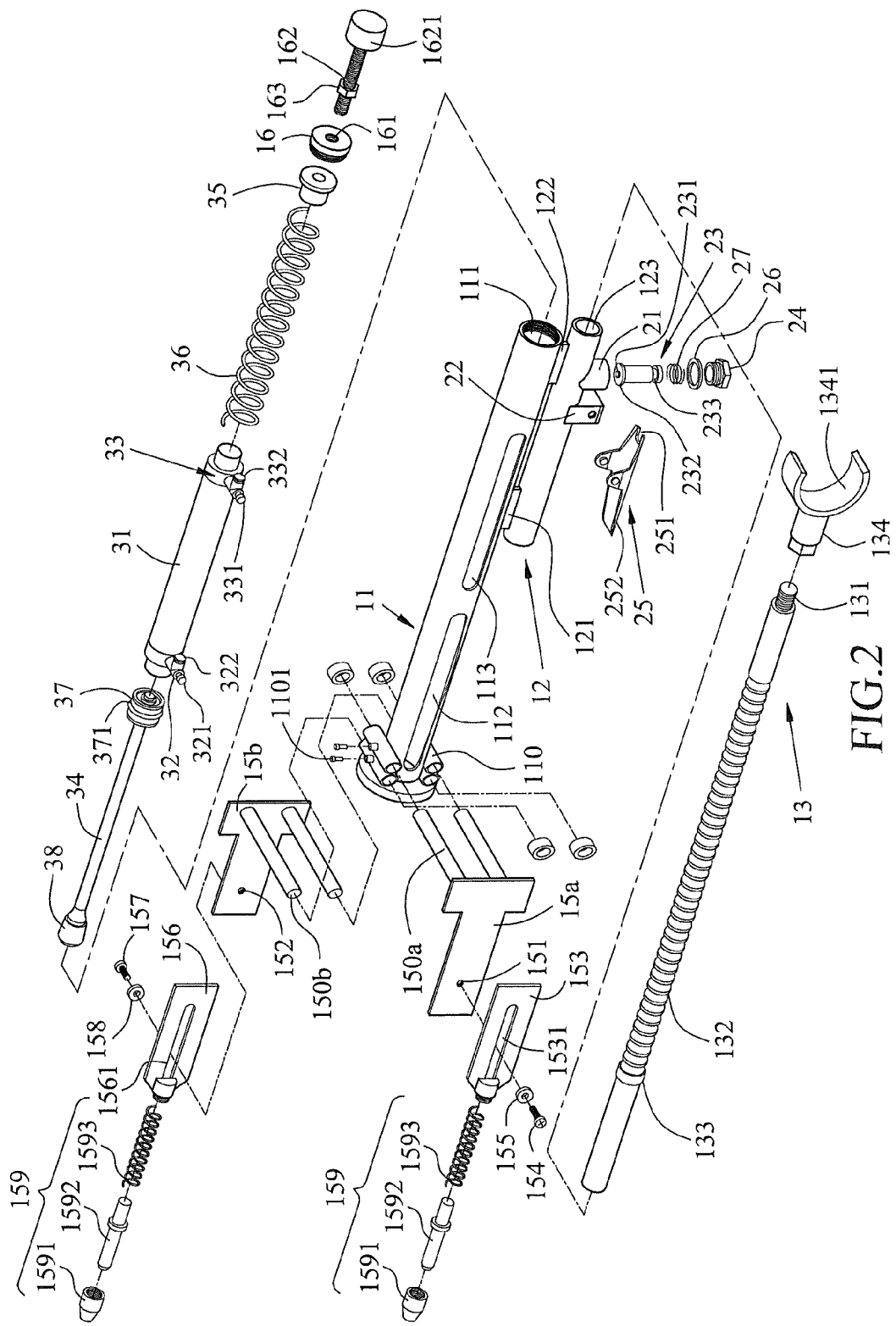
FIG. 2 is an explosion diagram illustrating the embodiment according to the present invention.
Figure 3:
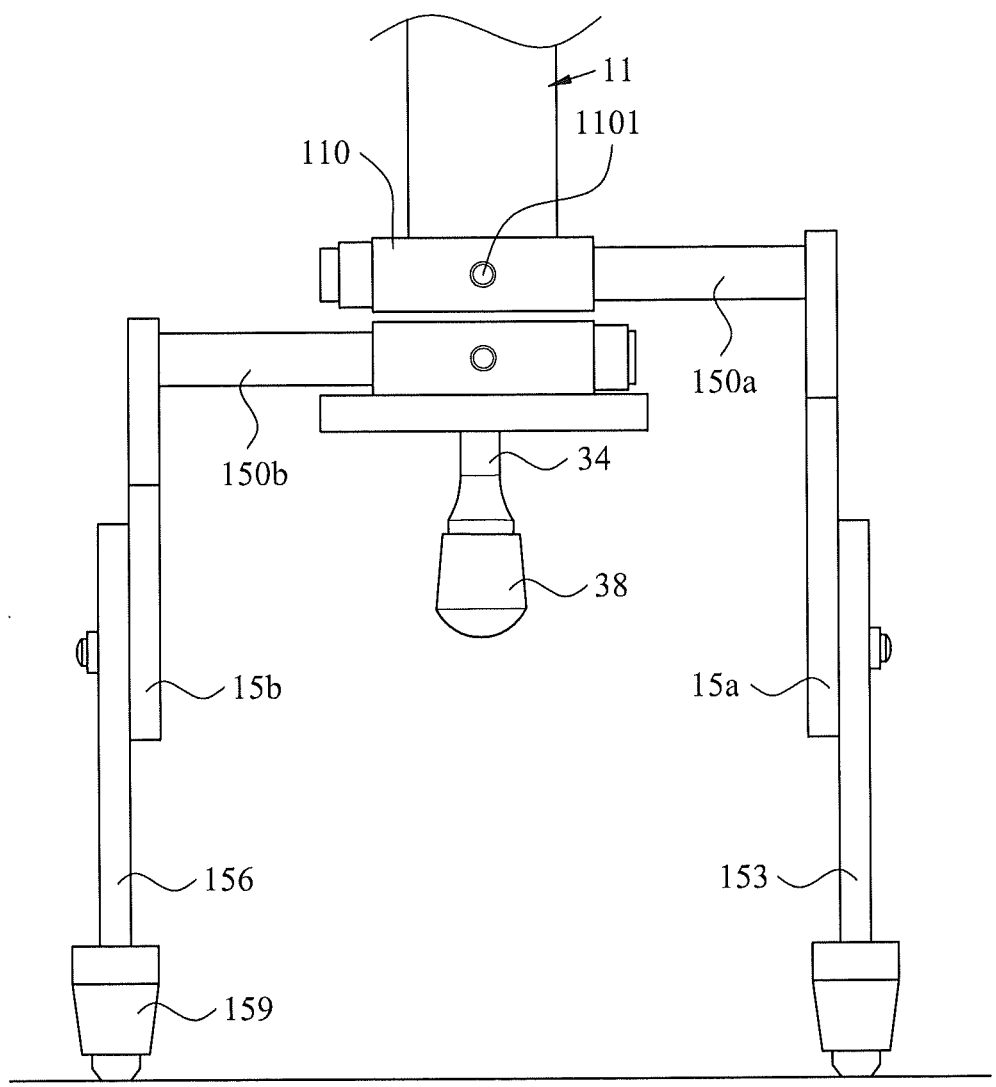
FIG. 3 and FIG. 4 are a schematic diagram illustrating an operation of the support frames of the embodiment according to the present invention.
Figure 4:
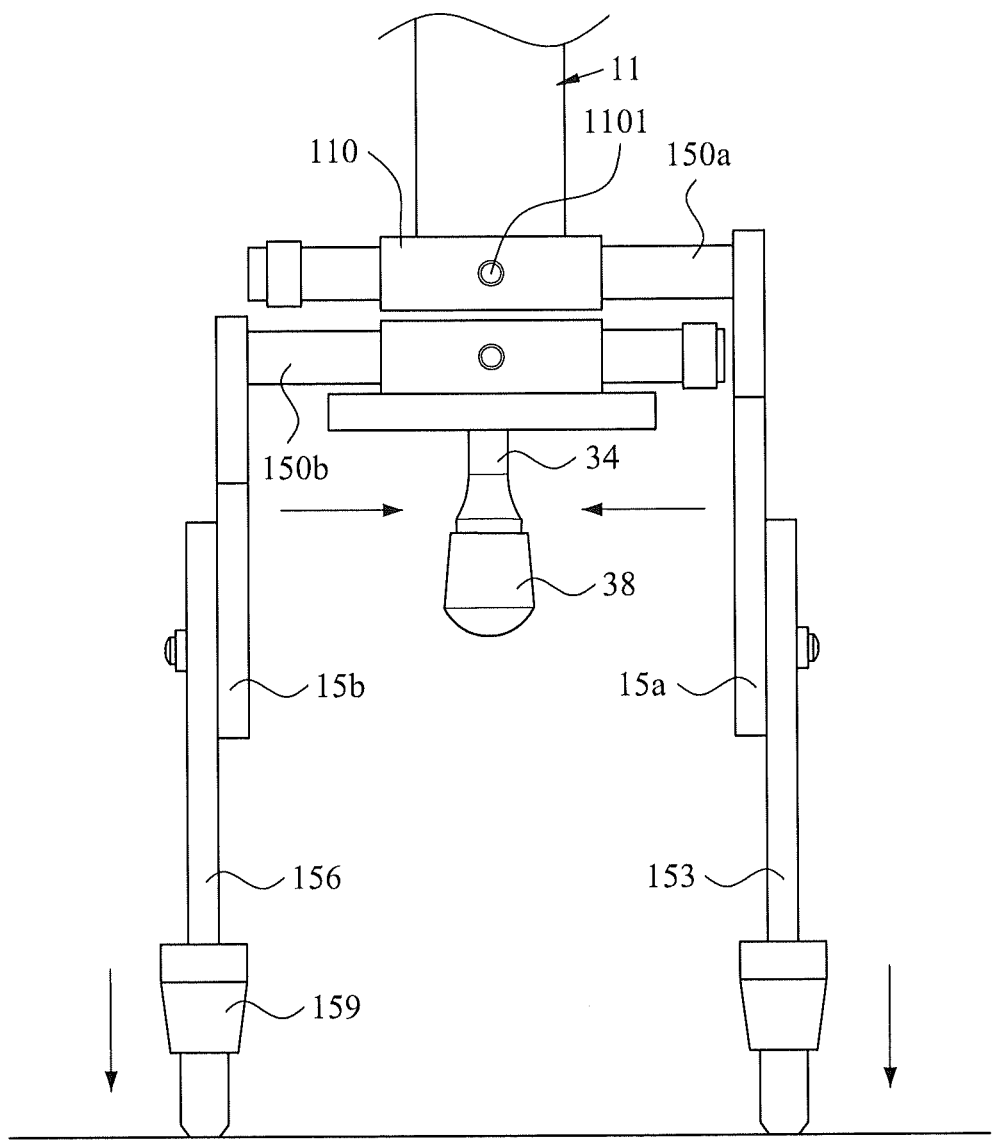
Figure 5:
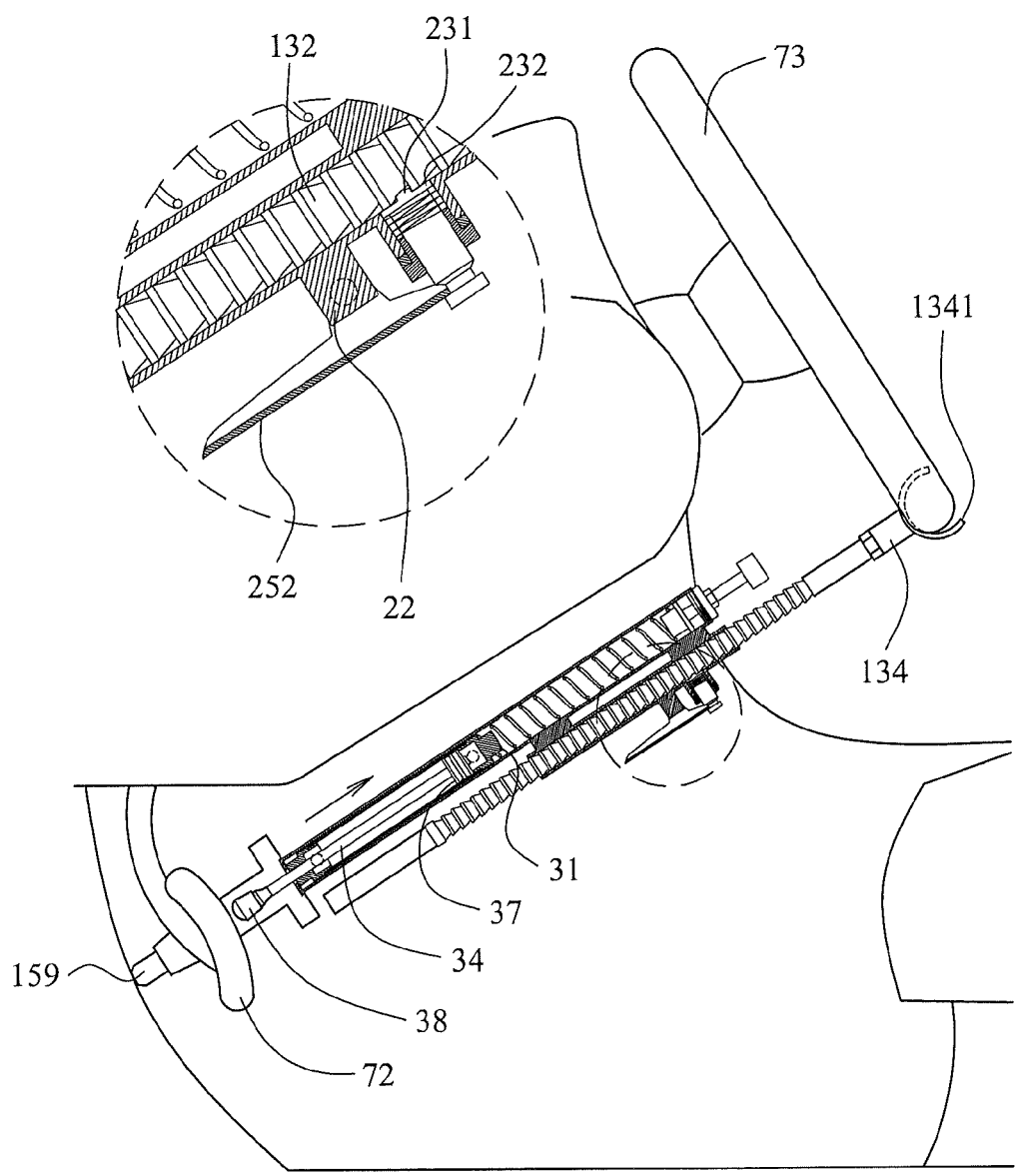
FIG. 5 is a cross-section view illustrating the action rod of the embodiment according to the present invention at a move-toward position.
Figure 6:
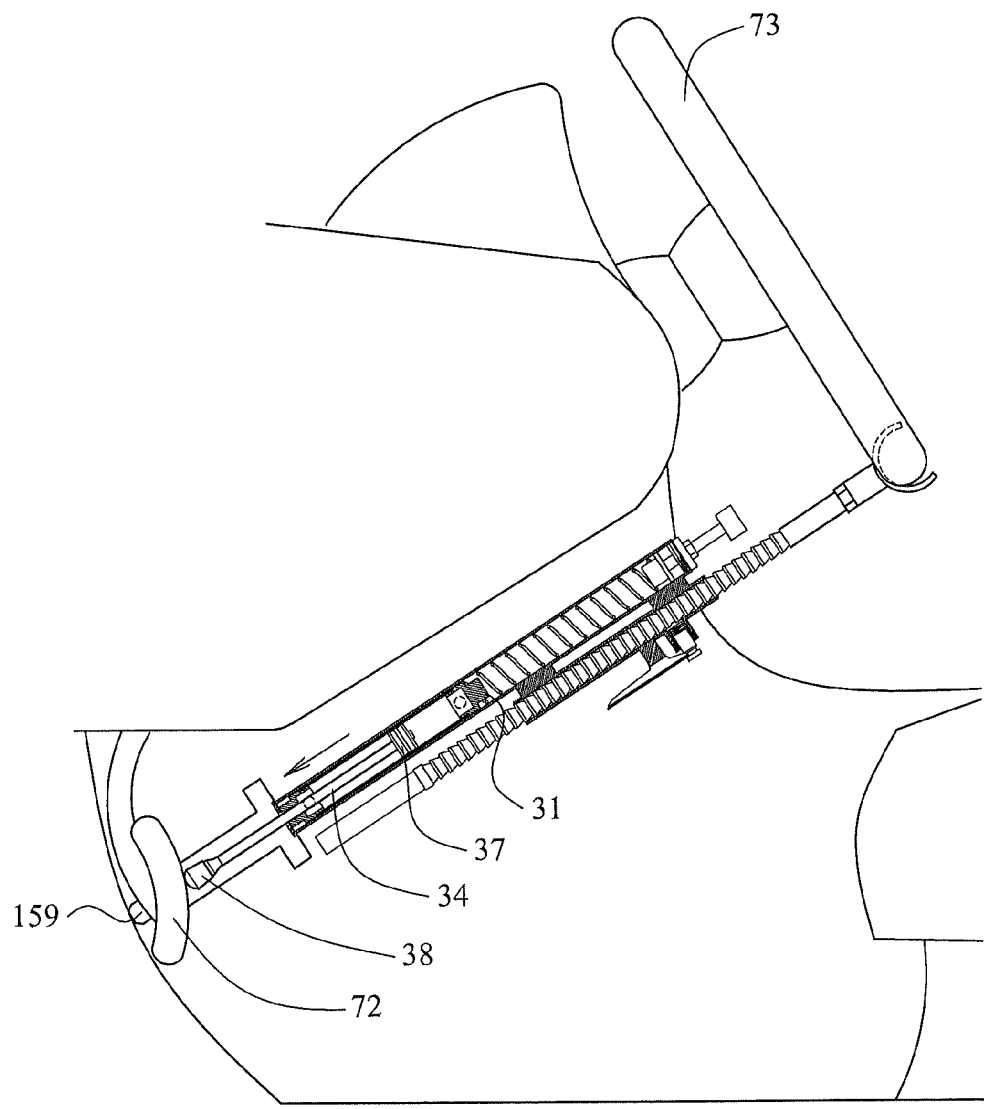
FIG. 6 is a cross-section view illustrating the action rod of the embodiment according to the present invention at a move-backward position.
Figure 7:
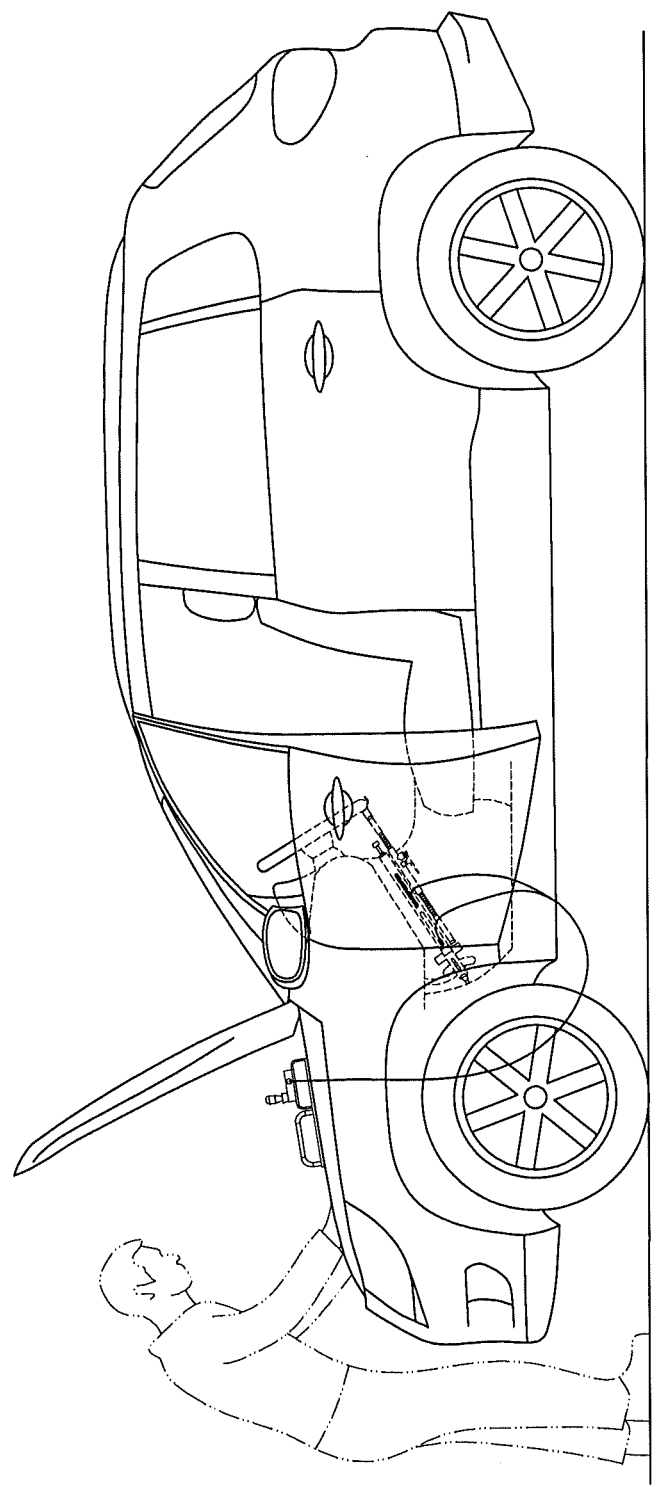
FIG. 7 is a schematic diagram illustrating the embodiment according to the present invention.

A main body 10 includes an outer rod 11, a support rod 12 and an adjusting rod 13. The outer rod 11 is provided with a first axial hole 111 on its center axis and is provided with two transverse casing pipes 110 at one end so as to fix with a support frame 15. The other end of the outer rod 11 is provided with a cover 16. The support frame 15 includes a first support frame 15a and a second support frame 15b. The first support frame 15a and the second support frame 15b respectively had a first transverse adjusting rod 150a and a second transverse adjusting rod 150b which both are appeared in shape of L-type. The first transverse adjusting rod 150a and the second transverse adjusting rod 150b are sleeved in two transverse casing pipes 110. The two transverse adjusting rods 150a, 150b are sleeved and slipped to different position within the two transverse casing pipes 110 and are fixed by bolts 1101, so a transversely distance between the first support frame 15a and the second support frame 15b are adjustable. The first support frame 15a is provided with a first screw hole 151 and the second support frame 15b is provided with a second screw hole 152. A first adjusting member 153 is provided with a first longitudinal slot 1531. A first screw 154 is threaded in the first screw hole 151 through a first washer 155 and the first longitudinal slot 1531 in sequence, so that the first adjusting member 153 is provided longitudinally and adjustably on one side of the first support frame 15a. Similarly, a second adjusting member 156 is provided with a second longitudinal slot 1561. A second screw 157 is threaded in the second screw hole 152 through a second washer 158 and the second longitudinal slot 1561 in sequence, so that the second adjusting member 156 is provided longitudinally and adjustably on one side of the second support frame 15b. By the above means, a longitudinal height and transversely opposite distance of the first and the second adjusting member 153, 156 are adjustable, and it is able to fit height and width of all kinds of brake pedals as shown in FIG. 3 and FIG. 4. Further, the first adjusting member 153 and the second adjusting member 156 both are provided with elastic skid-proof members 159 on their bottoms. The elastic skid-proof members 159 include nuts 1591, support members 1592 and springs 1593. The support members 1592 and the springs 1593 are fixed to bottoms of the first and the second adjusting member 153, 156 by the nuts 1591. When the first and the second adjusting member 153, 156 are placed to withstand a bottom of the car, it is found that the springs 1593, which has a characteristic of longitudinal elastic force to absorb the vibration of the car, will prevent the elastic skid-proof members 159 from being slipped and being inclined from the main body 10, as shown in FIG. 3 and FIG. 4.

The cover 16 is longitudinally provided with a screw hole 161 on a center. The screw hole 161 is threaded with an adjusting screw 162. The adjusting screw 162 is longitudinally provided at one end thereof with a knob 1621 and provided on an external circumference thereof with a nut 163 to thread with the cover 16. The outer rod 11 is provided with a first cut slot 112 and a second cut slot 113 on its external circumference along its axial direction. The first cut slot 112 and the second cut slot 113 are provided with a linear arrangement along the axial direction. The support rod 12 is provided with a first connecting part 121 and a second connecting part 122 on the side of its external circumference. The first connecting part 121 and the second connecting part 122 are connected the external circumference of the outer rod 11. The support rod 12 is longitudinally provided with a second axial hole 123 on its center axis. The adjusting rod 13 is provided with a connection element 131 at one end of the adjusting rod 13 and provided with a ratchet part 132 in a middle of an external circumference of the adjusting rod 13. The ratchet part 132 is provided with a blocking ring 133 on its bottom. The blocking ring 133 is used for avoiding the adjusting rod 13 from being completely pulled out from the support rod 12.

The connection element 131 is provided with a top supporting member 134. The top supporting member 134 is provided with a concave slot 1341.

A locking module 20 includes a bearer 21, a holder 22, a locking rod 23, a locking base 24 and a pressing member 25. The other side of the external circumference of the support rod 12 is connected to the locking module 20 which is locked to the ratchet part 132. The bearer 21 and the holder 22 are provided on the other side of the external circumference of the support rod 12. The bearer 21 and the holder 22 are provided with a linear arrangement along the axial direction. The locking base 24 is connected to the bearer 21 through a washer 26. The locking rod 23 is provided with a locking part 231 at one end of the locking rod 23 and provided with a ring groove 233 at the other end of the locking rod 23. The locking part is closely provided with a blocking part 232. A spring 27 and the locking base 24 sleeves and covers on the locking rod 23. A middle of the pressing member 25 is pivoted to the holder 22. The pressing member 25 is provided with an engaging section 251 at one end of the pressing member 25 and provided with a pressing section 252 at the other end of the pressing member 25. The engaging section 251 is engaged to the ring groove 233.

A pneumatic module 30 includes a pneumatic cylinder 31, a first airflow device 32, a second airflow device 33 and an action rod 34. The pneumatic cylinder 31, an elastic element 36 and a top holding member 35 are received by the first axial hole 111 in sequence. The elastic element 36 is a compression spring. The first airflow device 32 is placed within the first cut slot 112 and is connected with one end of an external circumference of the pneumatic cylinder 31. The second airflow device 33 is placed within the second cut slot 113 and is connected with the other end of the external circumference of the pneumatic cylinder 31. The first airflow device 32 and the second airflow device 33 are allocated to withstand the first cut slot 112 and the second cut slot 113 respectively. The pneumatic cylinder 31 is provided with a piston 37. The piston 37 is provided with a piston ring 371 on its external circumference. The action rod 34 is received at one end of the pneumatic cylinder 31. One end of the action rod 34 is connected to the piston 37 and the other end of the action rod 34 is connected to a contact member 38 which is an flexible body. The first airflow device is provided with a first adjusting valve 321 on its top surface and provided with a first airflow opening 322 on its external circumference. The second airflow device 33 is provided with a second adjusting valve 331 on its top surface and provided with a second airflow opening 332 on its external circumference.

A controller 60 is communicated with the first airflow opening 322 and the second airflow opening 332.

The controller 60 mounted in a worktable 70 is provided with a third airflow opening 61 and a fourth airflow opening 62 on one side of the controller 60. The first airflow opening 322 and the third airflow opening 61 are communicated through a first air pipe 63. The second airflow opening 332 and the fourth airflow opening 62 are communicated through a second air pipe 64. The controller 60 is provided with an air-in opening 65 on the other side of the controller 60. The air-in opening 65 is provided with a first air-out opening 66 and a second air-out opening 67 on two sides of the air-in opening 65. The air-in opening 65 is communicated to an air-supplying device 71 through a third air pipe 68. The air-supplying device 71 is an air compressor. The controller 60 is provided with a switch 69 on its top.

When the locking part 231 of the locking module 20 is locked to the ratchet part 132, the adjusting rod 13 is limited to only allow single direction of axially movement along the support rod 12. When the pressing section 252 is forced to separate the locking part 231 from the ratchet part 132, the locking effect of the locking module 20 is useless, and the adjusting rod 13 is able to axially move in double directions along the support rod 12.

The elastic element 36 is provided for being withstood by the pneumatic cylinder 31 to achieve an effect of a damping buffer. Further, the effect of a damping buffer of the elastic element 36 is adjustable by changing the force that the adjusting screw 162 depresses the top holding member 35.

The first adjusting member 153 and second adjusting member 156 is respectively provided on two sides of a brake pedal 72 inside the car, and the adjusting rod 13 is quickly pulled out by pressing the pressing section 252. Instantly, when the top supporting member 134 get close to a steering wheel 73, the locking part 231 is locked to the ratchet part 132 by releasing the pressing member 25. Next, the concave slot 1341 of the top supporting member 134 depresses on the steering wheel 73 by axially moving the adjusting rod 13 in a single direction, so that the installation is completed.

In order to fit an installation position and the depressing effect between a the brake pedal 72 and the contact member 38, it is found that a position of the first and the second adjusting member 153, 156 that contact with the first and the second support frame 15a, 15b is adjustable through the first longitudinal slot 1531 and the second longitudinal slot 1561.

Accordingly, when the switch 69 is operated to connect the air-in opening 65 with the fourth airflow opening 62 and to connect the third airflow opening 61 with the first air-out opening 66, it is found that a high pressure air is pushed into the pneumatic cylinder 31 through the second airflow device 33 to push the action rod 34 down to drive the contact member 38, so that the brake pedal 72 is moved toward and the exhaust air is expelled out from the first air-out opening 66 through the first airflow device 32 at the same time. On the other hand, when the switch 69 is operated to connect the air-in opening 65 and the third airflow opening 61 and connect the fourth airflow opening 62 and the second air-out opening 67, it is found that a high pressure air is pushed into the pneumatic cylinder 31 through the first airflow device 32 to push the action rod 34 move toward to drive the contact member 38, so that the brake pedal 72 is moved backward and the exhaust air is expelled out from the second air-out opening 67 through the second airflow device 33 at the same time. The replacement of the brake oil will be completed by repeating the above operation for driving the brake pedal 72 to move backward and toward to expel air within an oil pipe.

The flow flux of high pressure air flowing into or out the pneumatic cylinder 31 is able to be adjusted by adjusting the first adjusting valve 321 and the second adjusting valve 331.

However, a person skilled in the art may make various modifications to the present invention. Those modifications still fall within the spirit and scope defined by the appended claims.

What is claimed is:

1. A maintenance auxiliary tool of brake system comprising:
    a main body including an outer rod, a support rod and an adjusting rod, the outer rod provided with a first axial hole on its center axis and provided with a support frame at one end of the outer rod, a first adjusting member provided at one end of the support frame and longitudinally adjustable, a second adjusting member provided at the other end of the support frame and longitudinally adjustable, the first adjusting member and the second adjusting member arranged on the support frame and a transversely distance therebetween is adjustable, the outer rod longitudinally provided with a first cut slot and a second cut slot on its external circumference along its axial direction, one side of an external circumference of the support rod connected with the external circumference of the outer rod, the support rod longitudinally provided with a second axial hole on its center axis, the adjusting rod provided with a connection element at one end thereof and provided a ratchet element in a middle of an external circumference of the adjusting rod, the connection element provided with a top supporting member, the top supporting member provided with a concave slot;

a locking module provided in the other side of the external circumference of the support rod, the locking module connected to the ratchet part;

a pneumatic module including a pneumatic cylinder, a first airflow device, a second airflow device and an action rod, the pneumatic cylinder and an elastic element received within the first axial hole in sequence, the first airflow device placed within the first cut slot and connected with one end of an external circumference of the pneumatic cylinder, the second airflow device placed within the second cut slot and connected with the other end of the external circumference of the pneumatic cylinder, the first airflow device and the second airflow device depressing the first cut slot and the second cut slot respectively, the action rod connected to one end of the pneumatic cylinder, one end of the action rod connected to a piston and the other end of the action rod connected to a contact member, the first airflow device provided with a first adjusting valve on its top surface and provided with a first airflow opening on its external circumference, the second airflow device provided with a second adjusting valve on its top surface and provided with a second airflow opening on its external circumference; and a controller communicated with the first airflow opening and the second airflow opening.

2. The maintenance auxiliary tool of brake system as claimed in claim 1, wherein the first adjusting member and the second adjusting member both are provided with an elastic skid-proof member on their bottoms, and the elastic skid-proof member is flexible in longitudinal direction.

3. The maintenance auxiliary tool of brake system as claimed in claim 1, wherein the support frame is provided with a first screw hole on one side of the support frame and provided with a second screw hole on the other side of the support frame, the first adjusting member is provided with a first longitudinal slot, a first screw is threaded in the first screw hole through a first washer and the first longitudinal slot in sequence, the second adjusting member is provided with a second longitudinal slot, a second screw is threaded in the second screw hole through a second washer and the second longitudinal slot in sequence.

4. The maintenance auxiliary tool of brake system as claimed in claim 1, wherein one end opposite to the support frame of the first axial hole is connected to a cover, the first axial hole is provided with a top holding member between the cover and the elastic element, the cover is longitudinally provided with a screw hole on its center, the screw hole is threaded with an adjusting screw, the adjusting screw is provided with a knob at one end of the adjusting screw and provided with a nut on its external circumference.

5. The maintenance auxiliary tool of brake system as claimed in claim 3, wherein the support rod is provided with a first connecting part and a second connecting part on one side of the external circumference of the support rod, the first connecting part and the second connecting part are connected the external circumference of the outer rod.

6. The maintenance auxiliary tool of brake system as claimed in claim 1, wherein the first cut slot and the second cut slot are provided with a linear arrangement along the axial direction.

7. The maintenance auxiliary tool of brake system as claimed in claim 1, wherein the locking module includes a bearer, a holder, a locking rod, a locking base and a pressing member, the bearer and the holder are provided on the other side of the external circumference of the support rod, the locking base is connected to the bearer through a washer, the locking rod is provided with a locking part at one end of the locking rod and provided with a ring groove at the other end of the locking rod, the locking part is closely provided with a blocking part, the locking rod is sleeved and covered by a spring and the locking base, a middle of the depressing member is pivoted to the holder, the depressing member is provided with an engaging section at one end of the depressing member and provided with a pressing section at the other end of the depressing member, the engaging section is engaged to the ring groove.

8. The maintenance auxiliary tool of brake system as claimed in claim 1, wherein the controller is mounted in a worktable and provided with a third airflow opening and a fourth airflow opening on one side of the controller, the first airflow opening and the third airflow opening are communicated through a first air pipe, the second airflow opening and the fourth airflow opening are communicated through a second air pipe, the controller is provided with an air-in opening on the other side of the controller, the air-in opening is provided with a first air-out opening and a second air-out opening on two sides of the air-in opening, the air-in opening is communicated to an air-supplying device through a third air pipe, the controller is provided with a switch on its top.

9. The maintenance auxiliary tool of brake system as claimed in claim 1, wherein the elastic element is a compression spring for withstanding the pneumatic cylinder therewith.

10. The maintenance auxiliary tool of brake system as claimed in claim 1, wherein the ratchet part is provided with a blocking ring on its bottom.

* * * * *

UNITED STATES PATENT AND TRADEMARK OFFICE
CERTIFICATE OF CORRECTION

PATENT NO.         : 8,944,224 B2                                      Page 1 of 1
APPLICATION NO.    : 13/759110
DATED              : February 3, 2015
INVENTOR(S)        : Hsieh It is certified that error appears in the above-identified patent and that said Letters Patent is hereby corrected as shown below:

On Title Page:
Item (71), Applicant: Please correct: "Bao-Ching Hsieh, Bade (TW)"
to read as -- Bao-Ching Hsieh, Bade City (TW) --

Item (72), Inventor: Please correct: "Bao-Ching Hsieh, Bade (TW)"
to read as -- Bao-Ching Hsieh, Bade City (TW) --

In the Specification:
Column 3, Lines 21-23: Please correct:
"switch on its top. p In a preferred embodiment of the present invention, the elastic element is a compression spring for withstanding the pneumatic cylinder therewith,"
to read as -- switch on its top.
In a preferred embodiment of the present invention, the elastic element is a compression spring for withstanding the pneumatic cylinder therewith. --

Signed and Sealed this
Eighth Day of September, 2015

Michelle K. Lee
*Director of the United States Patent and Trademark Office*